Patented Aug. 4, 1953

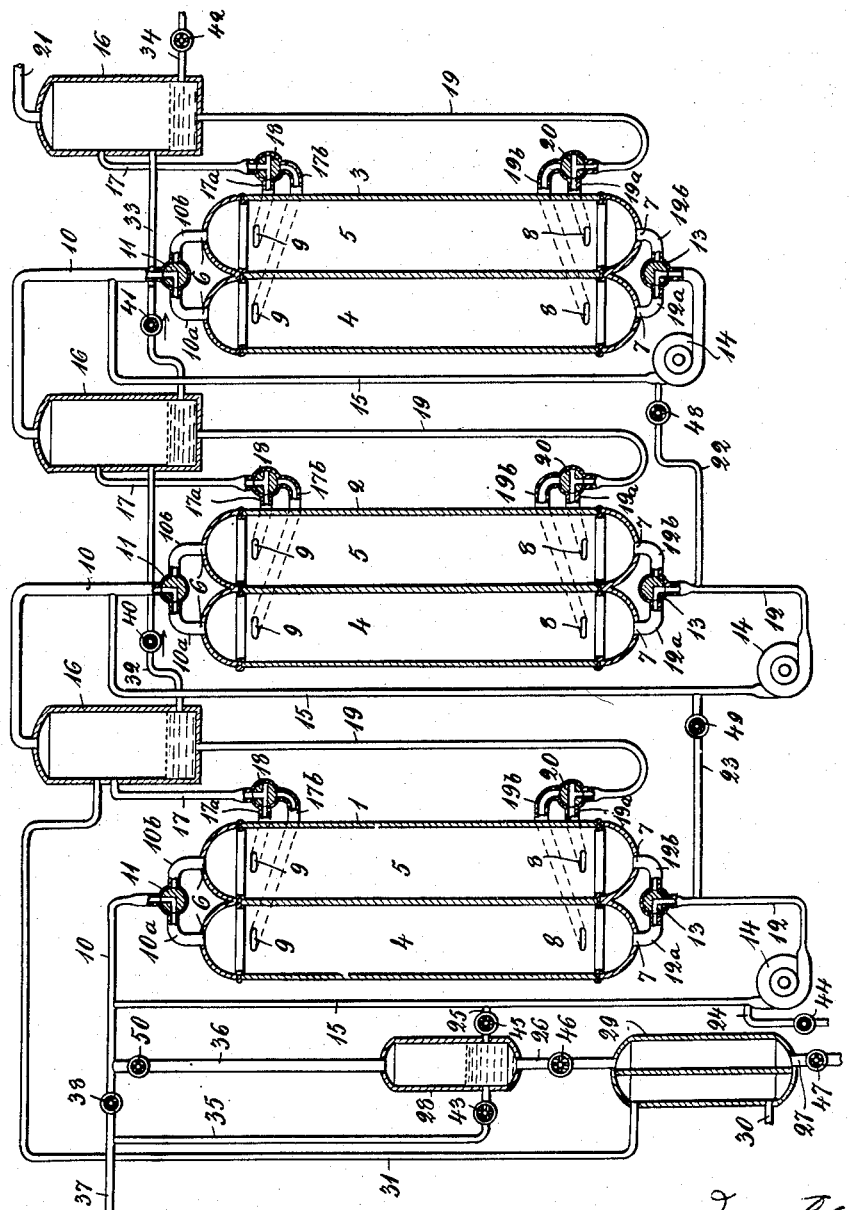

2,647,570

UNITED STATES PATENT OFFICE 2,647,570

HEAT-TREATING A FLUENT SUBSTANCE

Carl Johan Lockman, Stockholm, Sweden, assignor to Rosenblad Corporation, New York, N. Y., a corporation of New York Application January 21, 1950, Serial No. 139,811
In Sweden November 30, 1949

6 Claims. (Cl. 159—17)

This invention relates to heat treating and more particularly to a method and apparatus for evaporating or other heat treating a fluent substance tending to deposit scale in a multiple stage system including a plurality of evaporation units connected in series, in which a vaporized heating medium is supplied to the first unit in the series and the evaporation vapor or "flash" vapor from the fluent substance, and its condensate, is utilized as a heating medium in one or more succeeding units, and in which each unit comprises a heat exchanger with separate passages or systems of passages for conducting the heating medium and the fluent substance (the liquid) in heat exchange relation through the heat exchanger. It is desired, in such plants, to interchange periodically the paths of flow of the heating medium and the liquid to be heat treated so that scale, which during a certain cycle has been deposited from the liquid in the passages passed by the liquid, will be dissolved by the action of the heating medium during the succeeding cycle so as to keep the heat exchanging surfaces clean.

Particularly, the invention relates to heat treating a liquid of the kind in which condensate from the vapor of the liquid contains components which are especially adapted to promote the dissolution of the scales. An example of such a liquid is sulphite waste lye or liquor.

As well known it is mainly the liquid phase, that is the condensate, of the heating medium that will act as a solvent in the cases now referred to. Thus, in order that the scales formed in a passage system during a given cycle should be dissolved when the heating medium during the succeeding cycle flows through the same system it is necessary that the quantity of condensate, that is the solvent, available during the latter cycle will not be saturated with the dissolved scales until the dissolution has been completed, or, in other words, the quantity of new condensate produced must be enough for the dissolution process.

Due to the character of the multiple system from the point of view of heating technics the quantity of new condensate formed will be approximately equal in all units. On the other hand, the tendency of forming scales may vary to a high extent from one unit to the other, partly depending on the varying temperatures to which the liquid is exposed when flowing through one unit or the other, and partly depending on changes of the physical and chemical behavior of the liquid during the scale forming process.

Thus, it may happen that the quantity of new condensate formed will not be enough to effect the necessary dissolution in one or more units while the quantity may be in excess in one or more other units.

It is also obvious that if it is desired to evaporate a liquid forming a vapor condensate particularly suitable for dissolution of scales and if pure water vapor or steam be supplied to the first unit, merely the succeeding units will be able to take advantage of such particularly suitable condensate for the dissolution of scales.

One object of the invention is to utilize the new condensate formed successively and serving as solvent in the plant in such a manner that it may be distributed on the different units at least approximately proportionate (taken in respect of the quantity and/or scale dissolving quality of the condensate) to the scale forming tendency of the treated liquid in the individual units (or, if desired, in excess to the proportionate quantity).

A further object of the invention is to supply and admix scale dissolving condensate from one or more heat exchanging units of the series to the condensate flowing in contact with the scale coated heat exchanging surface in one or more other such units in which the scale forming tendency is greater than in the first-mentioned unit, so as to increase the quantity of scale dissolving solvent in the latter unit.

A still further object of the invention is to conduct condensate of a relatively high scale dissolving quality from one or more units in the series and to mix this condensate with condensate flowing in contact with scale coated heat exchanging surface and having relatively poor scale dissolving quality in one or more other units so as to improve the dissolving quality of the condensate in the latter units or units.

It is also an object of the invention to cause the condensate to circulate through the passage system for the heating medium at least in the unit or units to which the condensate as aforesaid is supplied from another unit. The fresh supply of condensate may be effected at any place in the circulation circuit.

A still further object of the invention is to conduct condensate of a high scale dissolving quality in direct absorbing contact with the vaporized heating medium before the latter is supplied to the first unit of the series, so that a portion of said condensate which has been absorbed in the vapor will be passed to and through the heating medium passage system of said unit in order to establish a scale dissolving action.

It is also an object of the invention to provide a simple and effective multiple stage heat treating system or plant for the process now referred to.

Further objects and advantages of the invention will be apparent from the following description taken in conjunction with the accompanying drawing, wherein the simple figure is a view partially in section diagrammatically illustrating the application of this invention to a multiple stage evaporation plant. Parts of identical function are indicated by the same reference characters.

In this connection it should be noted that the expressions "passage" and "passage system" are intended to cover not only the case that one passage in each heat exchanger is used for each of the heat exchanging media but also the case that each passage or passage system includes more channels for each medium.

The drawing illustrates as an example an embodiment of a triple stage evaporation system having a series of three evaporation units, it being assumed that the scale forming tendency is greatest in the first unit and then decreases successively in the second and third units.

Each of the three evaporation units has a heat exchanger 1, 2 and 3, respectively, each being provided with separate passages or channel systems 4 and 5 for passing alternatively heating vapor and liquid in heat exchanging relation. When heating vapor is passed through one passage the liquid to be evaporated is passed through the other passage and vice versa. In both cases the heating medium is passed through its passage from the top to the bottom while the liquid is passed from the bottom to the top. Each of the passages has an inlet 6 and an outlet 7 for the heating medium and an inlet 8 and an outlet 9 for the liquid.

In each heat exchanger either of the inlets 6 may be connected to a piping 10 for the supply of heating medium through a three way valve 11 and branch conduits 10a and 10b. In the same manner a three way valve 13 and branch conduits 12a, 12b are provided to selectively connect either of the outlets 7 to a discharge piping 12 for condensate. For each heat exchanger there is also provided a pump 14 adapted to return the condensate in circulation from the piping 12 through a return conduit and the piping 10 to that one of the passages 4 or 5 which just is passed by the heating medium.

Each heat exchanger is also associated with a flash chamber or a vapor separator 16, in which the vapor space is adapted selectively to be connected to the outlets 9 of the preceding heat exchanger through a piping 17, a three way valve 18 and branch conduits 17a and 17b while the liquid space at the bottom of the flash chamber is adapted selectively to be connected to the inlets 8 of the same heat exchanger through a piping 19, a three way valve 20 and branch conduits 19a and 19b. The said vapor space also communicates with the pipings 10 of the succeeding heat exchangers except at the last flash chamber in the series of units, said last flash chamber instead having a discharge pipe 21.

Pipings 22 and 23 interconnect in series the different condensate circulation systems. Through a discharge pipe 24 and/or through a piping system 25, 26 and 27 including a mixing chamber or vessel 28 and a heat exchanger 29 the total quantity of new condensate continuously produced may be removed from the system. The pipings 24, 25, 26 and 27 may be shut off or controlled by means of valves 44, 45, 46 and 47, respectively. Also in the pipings 22 and 23 there are provided valves 48 and 49, respectively.

The liquid to be evaporated is supplied through an inlet 30 which communicates with the liquid circulation system 16, 19, 5, 17 of the first unit, the liquid preferably passing through the heat exchanger 29 and a conduit 31 connected to the piping 17. Pipings 32 and 33 having valves 40 and 41, respectively, are adapted to connect the liquid space at the bottom of the individual flash chambers or vapor separators 16 to the circulation system of the succeeding unit. A valved piping 34 (the valve being indicated at 42) from the last flash chamber 16 serves as a discharge piping for the liquid which has been concentrated in the plant. An inlet 37 for the supply of vapor or steam communicates selectively with either of the passages 4 or 5 of the heat exchanger 1 through the piping system 10, 10a, 10b. The communication between the pipings 37 and 10 may be direct or the vapor may be passed from the inlet 37 through the valved piping 35 (the valve being indicated at 43) into the mixing chamber 28 in which the vapor is mixed with condensate from the valved piping 25 (the valve indicated at 45) and passed through the valved piping 36 (the valve indicated at 50) into the piping 10.

Assuming that all three way valves are set in the manner illustrated in the drawing the system will operate in the following manner. The liquid to be evaporated may be for instance, sulphite waste liquor.

The liquor or dilute lye is supplied to the first unit in the passage 5 of the heat exchanger 1 through the piping system 30, 29, 31, 16, 19, 19a. Fresh vapor or steam is supplied to the passage 4 of the same heat exchanger 1 through the piping system 37, 10, 10a or 37, 35, 28, 36, 10, 10a. During the action of the heat exchange in the heat exchanger 1 the liquor is caused to boil. A mixture of liquor and vapor from the liquor flows through the pipings 17a, 17 to the adjacent flash chamber 16 from which separated and thickened liquor will return in circulation through the pipings 19, 19a to said passage 5 and also flows to the succeeding liquor circulation system and the passage 5 of the heat exchanger 2 through the pipings 32, 19, 19a of the latter system. The separated liquor vapor ("flash vapor") serving as heating medium is passed from the first flash chamber 16 through the pipings 10, 10a of the heat exchanger 2 to the passage 4 of said heat exchanger in which the same process as in the preceding heat exchanger will be repeated. In a similar manner still more thickened liquor and flash vapor pass to the passages 5 and 4, respectively, of the last heat exchanger 3 and its liquor circulation system, from where the liquor in finally concentrated condition is discharged from the system through the discharge pipe 34.

Pressure and temperature will be highest in the heat exchanger 1, lower in the heat exchanger 2 and lowest in the heat exchanger 3 in which in this case the pressure is assumed to be approximately the same as the atmospheric pressure. The concentration of the liquor will be lowest in the unit 1, higher in the unit 2 and highest in the unit 3. In these conditions the tendency of depositing scale on the heat exchanging surfaces contacted by the liquor in the passages 5 will be greatest in the heat exchanger 1, smaller in the heat exchanger 2 and still smaller in the heat exchanger 3, and this decrease of the scale forming tendency will be very marked. On reversing all three way valves 11, 13, 18 and 20 so as to connect the pipings 10b, 12b, 17b and 19b the evaporation process will not change except that now the passages 4 will be passed by liquor while the passages 5 will be passed by vapor, the condensate of which will have a dissolving action on the scales formed in the passages 5 before reversing the valves.

It is a matter of course with this system that approximately an equal quantity of condensate will deposit in all units and that thus, relative to the scale forming tendency, the production of new solvent will be the least in the heat exchanger 1, greater in the heat exchanger 2 and greatest in the heat exchanger 3 unless no particular steps are taken to effect an equalization. According to the invention, therefore, in this case the quantity of new condensate formed continuously in the heat exchanger 3 and having a low saturation degree in respect of dissolved scale products is passed through the piping 22 to the heat exchanger 2 so as to increase the quantity of solvent in the condensate circulation system of said heat exchanger so that said quantity, in spite of the greater scale forming tendency, will be in excess of the quantity necessary for complete dissolution. From the heat exchanger 2 a quantity of condensate corresponding to the total quantity of new condensate formed in the heat exchangers 3 and 2 and still having a relatively low degree of saturation of scale products will be passed to the heat exchanger 1 through the piping 23 so as to increase still more the quantity of solvent in this heat exchanger. The condensate in the heat exchangers 2 and 3 and formed from the flash or liquor vapor has an acid character and is particularly capable of dissolving scales of the kind now referred to. This is not the case with the condensate from the fresh vapor or steam in the heat exchanger, and said condensate is therefore inferior to the aforesaid condensate in the units 2 and 3 as regards the scale dissolving qualities. According to the invention, therefore, flash vapor condensate from the heat exchangers 2 and 3 also for this reason is admixed to the condensate of fresh vapor in the heat exchanger 1 in order to improve the dissolving qualities of the condensate circulating in said heat exchanger 1. The quantity of condensate passed in this manner may be controlled by means of the valves 48 and 49 in the pipings 22 and 23.

The improvement of the scale dissolving quality of the condensate in the units 1 may also be gained by causing the vapor condensate from the liquor to contact and to acidify the fresh vapor or steam before entering the heat exchanger. This may be effected, for instance, by passing condensate from the pump 14 through the discharge system 25, 28, 26, 29 and 27 in such a manner that a predetermined level of liquid is maintained in the mixing chamber 28, fresh vapor or steam being passed through the condensate contained in this mixing chamber and through the piping system 37, 35, 28, 36 and 10.

The invention is not restricted to evaporation plants in which the condensate circulates in each heat exchanging unit but the invention may be applied also when there is no such circulation. In this case the condensate from one heat exchanger may, for instance, be passed directly to the vapor supply inlet of the other heat exchanger. The main point is that condensate from one heat exchanger may be caused to act as a solvent in another heat exchanger. It is also obvious that if the scale formation is distributed in a different manner than as assumed in the example described, for instance if the scale forming tendency is increasing and decreasing alternatively from one unit to the other, the passing of condensate according to the invention will be modified accordingly so that the total dissolution quality collected in form of the total new condensate formed continuously will be distributed on the individual heat exchangers so that the dissolution quality will not be insufficient at any place. Of course, the means for effecting such a distribution may be modified within the scope of the present invention.

The process may also be simplified by passing the condensate in circulation through all or a certain group of the heat exchangers in series. In this case condensate in excess or with good scale dissolving quality need not be passed directly to the heat exchanger or heat exchangers in which the formation of scale is most difficult and in which thus an improvement of the scale dissolving conditions is required, but the said condensate may, instead, be caused first to pass in circulation through one or more other heat exchangers in an arbitrary succession. The main point is that the condensate circulated in this manner will be utilized sooner or later in heat exchanger or heat exchangers having a particular need for an improved dissolution of the scales. At a suitable place of this circulation system a discharge condensate is arranged for.

What I claim is:

1. A method of dissolving scale on the heating surfaces of a multiple stage system for indirect evaporation of a fluent substance tending to deposit scale to a different degree in different stages, said evaporation producing a vapor the condensate of which has the capability of dissolving such scale, comprising the steps of passing said substance through said system over one side of the heat transmitting walls of each stage in heat exchanging relation therewith, passing a vaporized heating medium on the other side of the heat transmitting walls of the first stage in heat exchanging relation therewith to produce condensate of said medium and to evaporate fluent substance in contact with the opposite side of said wall, utilizing in a similar manner, vapor from the fluent substance as heating medium from stage to stage in the remaining stages, periodically interchanging the paths of flow of heating medium and fluent substance so as to flood those heat transmitting wall surfaces which previously were in contact with fluent substance with heating medium condensate and vice versa, and supplying additional condensate from a stage in which the tendency to deposit scale is relatively low to said heating surface of another stage where the tendency to deposit scale is relatively high.

2. A method as defined in claim 1 in which the condensate flooding the heating surface in a stage to which condensate is supplied from another stage is repassed in circulation over said heating surface.

3. A method of dissolving scale on the heating surfaces of a multiple stage system for indirect evaporation of a fluent substance tending to deposit scale, said evaporation producing a vapor the condensate of which has the capability of dissolving such scale, comprising the steps of passing said substance through said system over one side of the heat transmitting walls of each stage in heat exchanging relation therewith, passing a vaporized heating medium on the other side of the heat transmitting walls of the first stage in heat exchanging relation therewith to produce condensate of said medium and to evaporate fluent substance in contact with the opposite side of said wall, utilizing in a similar manner, vapor from the fluent substance as heating medium from stage to stage in the remaining stages, periodically interchanging the paths of flow of heating medium and fluent substance so as to flood those heat transmitting wall surfaces which previously were in contact with fluent substance with heating medium condensate and vice versa, and supplying additional condensate from one stage where the dissolving capacity of the condensate is only partly utilized to completely dissolve the scale in that stage to said heating medium condensate which is used to flood the heating surface of another stage where the dissolving capacity of said last mentioned condensate is insufficient for complete dissolving of the scale in that stage.

4. A method as defined in claim 3 in which the condensate flooding the heating surface in a stage to which condensate is supplied from another stage is repassed in circulation over said heating surface.

5. A multiple stage heat treating system comprising a plurality of heat exchangers, each heat exchanger being associated with a vapor separating chamber and having passages for conducting in heat exchange relation a heating medium, inlet and outlet ports for each passage of each heat exchanger, a valved connection joining the inlet ports of adjacent passages, a second valved connection joining the outlet ports of adjacent passages, the valves of said valved connections being operative to alternate the flow of heating medium from one to the other of the adjacent passages, fluent substance inlet and outlet ports for each passage of each heat exchanger, a valved connection joining the fluent substance inlet ports of adjacent passages, a second valved connection joining the fluent substance outlet ports of adjacent passages, the valves of said valved connections being operative to alternate the flow of fluent substance from one to the other of adjacent passages, a connection for conducting fluent substance from the associated vapor separating chamber to the valved connection of said fluent substance inlet ports, a connection for conducting fluent medium from the valved connection of said fluent substance outlet ports to the associated vapor separating chamber, a connection from the vapor space of said chamber to the valved connection joining the heating medium inlet ports of the heat exchanger of the next stage, each heat exchanger having a connection provided with a pumping device as part of a system for passing in circulation condensate from the heating medium outlet to the heating medium inlet of that heat exchanger, and a valved connection for withdrawing condensate from said circulation system to the corresponding circulation system of another stage.

6. A multiple stage heat treating system comprising a plurality of heat exchangers each heat exchanger having passages for conducting in heat exchange relation a heating medium and a fluent substance tending to deposit scale, and the vapor condensate of which contains scale dissolving components, means for passing said substance through said system from stage to stage, means for passing a vaporized heating medium through the first stage of said system, means for passing flash vapor from said substance as a heating medium through each succeeding stage, means for collecting vapor condensate from at least one of said succeeding stages, and passing said condensate through a vessel, means for maintaining a predetermined condensate level in said vessel, a connection for passing vaporized heating medium into that vessel beneath that level, a connection above that level to pass vaporized heating medium from said vessel to the first stage of the system, and means to alternate the flow of heating medium and fluent substance from one to the other of adjacent passages of each heat exchanger.

CARL JOHAN LOCKMAN.

References Cited in the file of this patent

UNITED STATES PATENTS

| Number | Name | Date |
| --- | --- | --- |
| 264,203 | Walker | Sept. 12, 1882 |
| 1,006,197 | Frasch | Oct. 17, 1911 |
| 1,469,475 | Wirth-Frey | Oct. 2, 1923 |
| 1,623,941 | Sebold | Apr. 5, 1927 |
| 2,488,598 | Lockman | Nov. 22, 1949 |
| 2,490,750 | Grewin et al. | Dec. 6, 1949 |
| 2,508,119 | Lockman | May 16, 1950 |

FOREIGN PATENTS

| Number | Country | Date |
| --- | --- | --- |
| 63,200 | Germany | July 11, 1892 |
| 153,310 | France | Jan. 29, 1883 |